US010603851B2

(12) United States Patent
Hilton et al.

(10) Patent No.: US 10,603,851 B2
(45) Date of Patent: Mar. 31, 2020

(54) APPARATUS AND METHODS FOR CUTTING MATERIALS

(71) Applicant: The Boeing Company, Chicago, IL (US)

(72) Inventors: Corydon D. Hilton, North Charleston, SC (US); AbuMuhammed A. Zaman, Renton, WA (US)

(73) Assignee: The Boeing Company, Chicago, IL (US)

( * ) Notice: Subject to any disclaimer, the term of this patent is extended or adjusted under 35 U.S.C. 154(b) by 171 days.

(21) Appl. No.: 15/667,807

(22) Filed: Aug. 3, 2017

(65) Prior Publication Data

US 2019/0039336 A1 Feb. 7, 2019

(51) Int. Cl.
| | | |
|---|---|---|
| *B29C 70/54* | (2006.01) | |
| *B29C 70/38* | (2006.01) | |
| *B29K 105/06* | (2006.01) | |
| *B29K 307/04* | (2006.01) | |

(52) U.S. Cl.
CPC .......... *B29C 70/545* (2013.01); *B29C 70/384* (2013.01); *B29K 2105/06* (2013.01); *B29K 2307/04* (2013.01)

(58) Field of Classification Search
CPC ... B29C 70/382; B29C 70/545; B26C 70/384; B26C 70/386; B26D 2001/0053
See application file for complete search history.

(56) References Cited

U.S. PATENT DOCUMENTS

| | | | |
|---|---|---|---|
| 3,292,478 A | 12/1966 | Falk et al. | |
| 3,411,208 A | 11/1968 | Malm | |
| 4,274,319 A | 6/1981 | Frye et al. | |
| 8,584,662 B2 * | 11/2013 | Whitehead | B26F 1/14 125/23.01 |
| 2004/0173074 A1 | 9/2004 | Li et al. | |
| 2007/0209486 A1 * | 9/2007 | Gauthier | B25B 13/463 81/467 |
| 2013/0032287 A1 * | 2/2013 | Hagman | B29C 70/388 156/267 |

* cited by examiner

*Primary Examiner* — Jennifer B Swinney
(74) *Attorney, Agent, or Firm* — Walters & Wasylyna LLC

(57) ABSTRACT

A cutting apparatus including a cutting blade configured to slide along a surface of an anvil to cut tow material. The cutting blade includes a first bottom face portion and a cutting edge. The cutting blade further includes a second bottom face portion positioned between the first bottom face portion and the cutting edge. The first bottom face portion is configured to contact the surface of the anvil when the cutting blade slides along the surface to cut the tow material. The second bottom face portion and the cutting edge are located above the first bottom face portion such that the second bottom face portion and the cutting blade are free of contact from the surface when the cutting blade slides along the surface to cut the tow material.

20 Claims, 13 Drawing Sheets

APPARATUS AND METHODS FOR CUTTING MATERIALS

FIELD

This application relates to apparatus and methods for cutting materials and, more particularly, to apparatus and methods utilizing a cutting blade configured for increased blade life.

BACKGROUND

Automated fiber placement (AFP) machines use composite manufacturing technologies to increase rate and precision in the production of advanced composite parts. AFP machines place fiber reinforcements on mandrels in an automatic fashion and cut them in separate small width tows of thermoset or thermoplastic pre-impregnated materials to form composite layups. Existing cutting blades for AFP Machines may have a thin Physical Vapor Deposition ("PVD") coating over a blade body made of steel or carbide material. These cutter blades are designed such that the cutting edge of the blade repeatedly slides over the rear anvil. The repetitive sliding action of the cutting edge of the blade against the rear anvil of the machine wears the anvil making it rough over time. The worn anvil in turn leads to premature wear or failure of the carbide-based cutting blade. Failures are most often caused by wear or chipping at the edge of the cutting blade. Also, the chipped cutting blade frequently results in incomplete or partial tow cuts, where the cut does not go through the entire width of the composite material.

Time studies have shown that these cutting issues contribute significantly to the downtime of the AFP Machine, since the manufacturing technicians are usually required to stop the operation of the machine when cut failures occur. Additionally, failed cuts create rework for the manufacturing technicians.

SUMMARY

In one embodiment, a cutting apparatus is provided. The cutting apparatus includes a cutting blade configured to slide along a surface of an anvil to cut tow material. The cutting blade includes a cutting edge and a bottom face. The bottom face has a first portion and a second portion. The second portion is positioned between the cutting edge and the first portion. The first portion is configured to contact the surface of the anvil when the cutting blade slides along the surface to cut the tow material. The second portion and the cutting edge are located above the first portion such that the second portion and the cutting blade are free of contact from the surface when the cutting blade slides along the surface to cut the tow material.

In another embodiment, a cutting apparatus is provided. The cutting apparatus includes a cutting blade configured to slide along a surface of an anvil to cut tow material. The cutting blade includes a cutting body. The cutting body has a bottom face and a distal side. The cutting body includes a recess formed in the bottom face and the distal side. The cutting blade further includes an insert securely disposed inside the recess. The insert includes a cutting edge. The bottom face is configured to contact the surface when the blade slides along the surface to cut the tow material. The insert is located above the bottom face such that the insert is free of contact from the surface when the cutting blade slides along the surface to cut the tow material.

In another embodiment, a method is provided. The method includes a) providing a cutting apparatus having a cutting blade, wherein the cutting blade includes a first bottom face portion and a cutting edge, wherein the cutting blade further includes a second bottom face portion positioned between the first bottom face portion and the cutting edge; b) sliding the cutting blade along a surface of an anvil of the cutting apparatus toward a passageway in the anvil such that the first bottom face portion contacts the surface and the second bottom face portion and the cutting edge are free of contact from the surface; and c) feeding tow material through the passageway as the cutting blade slides along the surface until the cutting edge cuts the tow material at a predetermined length.

Other embodiments of the disclosed apparatus and methods for cutting materials will become apparent from the following detailed description, the accompanying drawings and the appended claims.

DETAILED DESCRIPTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Furthermore, the described features, structures or characteristics may be combined in any suitable manner in one or more embodiments. In the following description, numerous specific details are provided to give a thorough understanding of the example embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Figure 1:
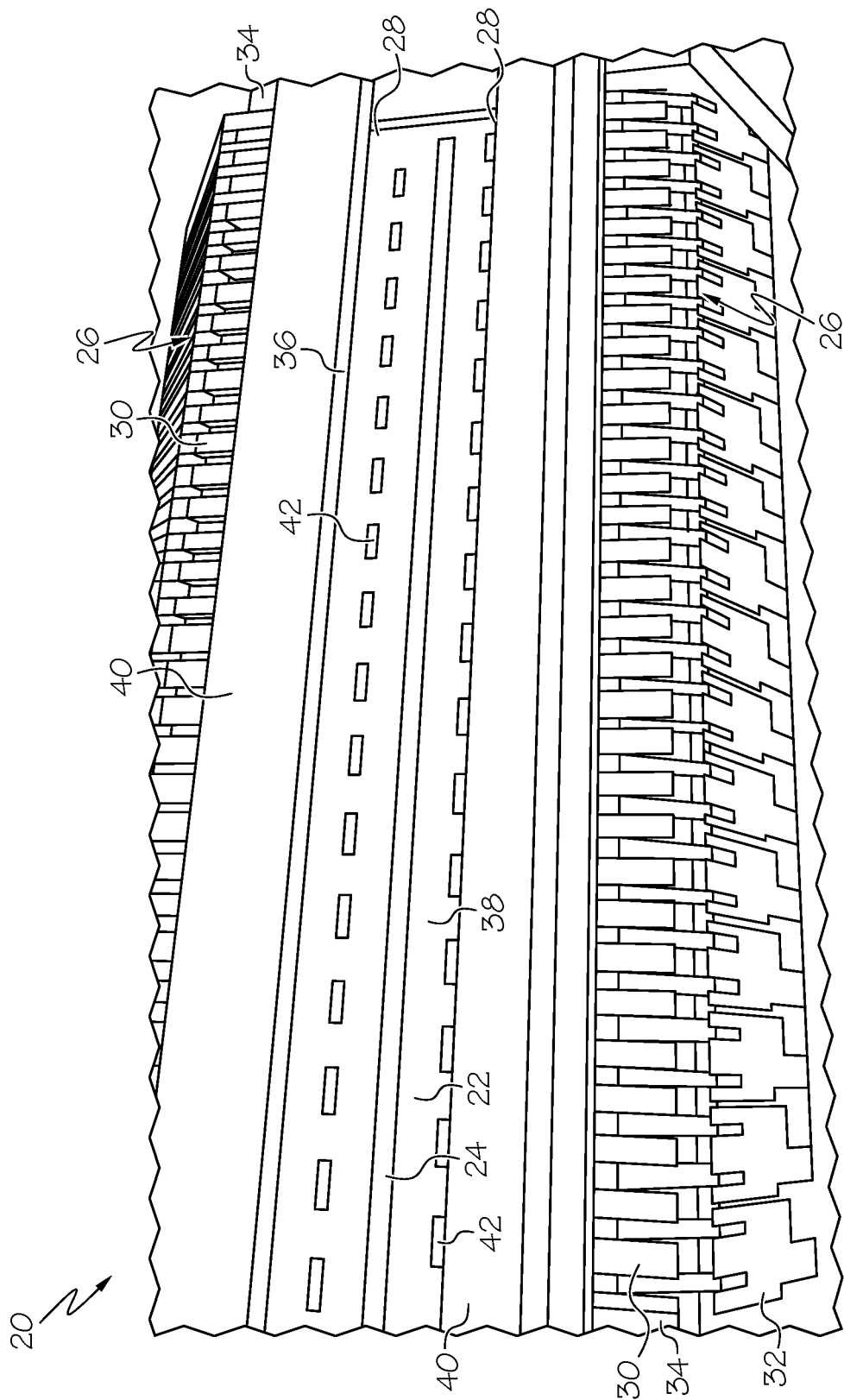
FIG. 1 is a top and rear perspective view of a cutting apparatus according to an embodiment.

FIGS. 1-8 illustrate an embodiment of a cutting apparatus. The cutting apparatus may be an AFP machine 20. However, it is contemplated that this embodiment can be incorporated into other cutting machines that include cutting blades for cutting materials such as Automated Tape Laying (ATL) Machines. Referring to FIG. 1, the AFP machine 20 comprises a rear anvil 22 that has a longitudinal slit 24 in the center of the anvil 22. The AFP machine 20 further comprises a pair of cutting assembles 26 located on opposite longitudinal ends 28 of the anvil 22. Each cutting assembly 26 includes a cutting blade 30 that is pivotally connect to a cutting base 32. Each cutting assembly 26 is affixed to rollers 34 that guide the cutting blade 30 through a slot 36 defined by the upper surface 38 of the anvil 22 and a shield 40 located over the longitudinal end 28 of the anvil 22. Two rows of rectangular shaped passageways 42 are formed in the anvil 22 and extend through the upper surface 38. Each row of passageways 42 is located between the shield 40 and the slit 24. Carbon fiber composite tow material (FIG. 2) is fed through the passageways 42 and is cut in predetermined lengths by the cutter blades 30 as they slide through the slot 36 along the upper surface 38 of the anvil 22 to form tows 41. The tow 41 may have a width of 0.250 inches. The tow may be comprised of an uncured carbon fiber reinforced polymer (CFRP), or other thermosetting or thermoplastics tapes.

Figure 2:
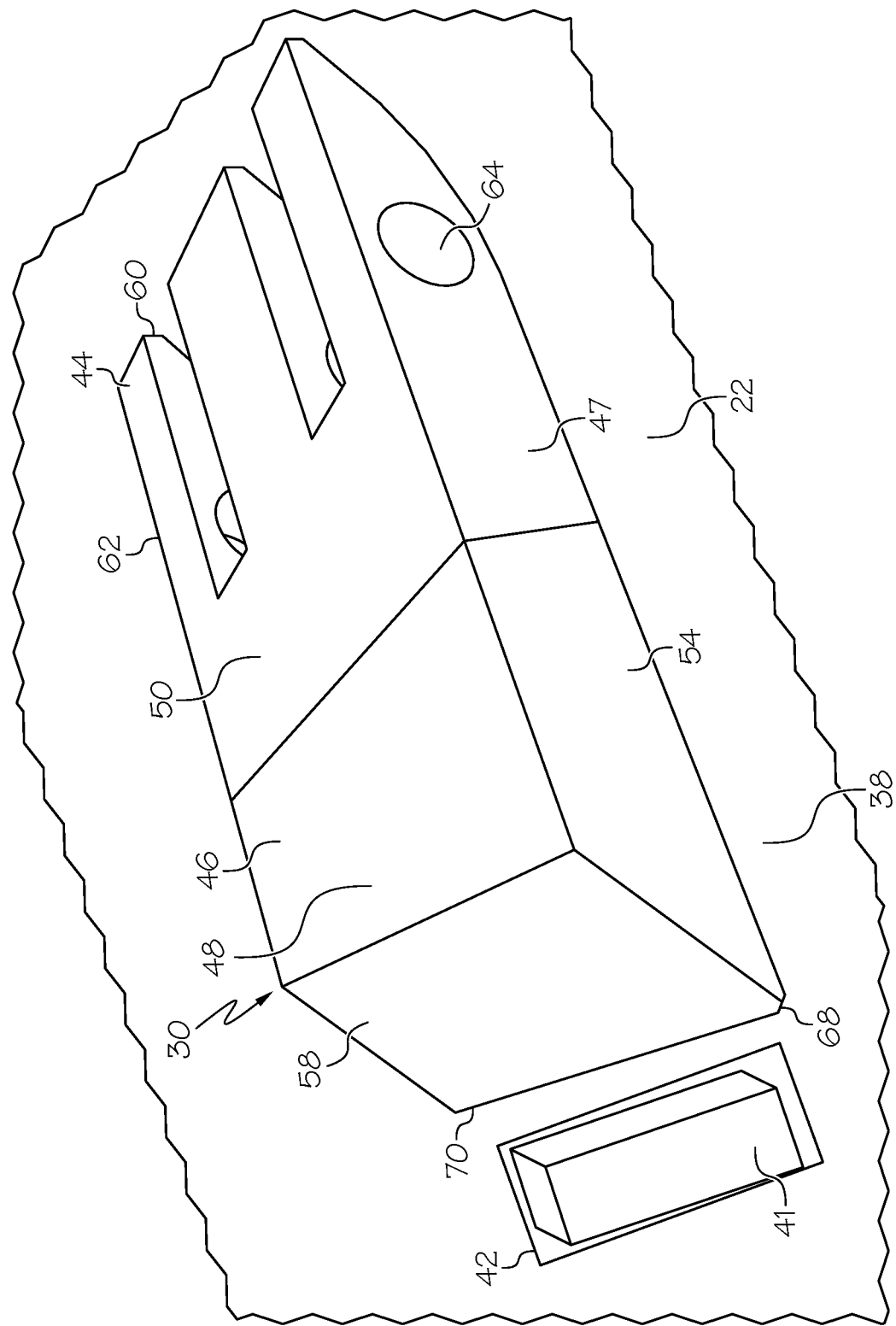
FIG. 2 is a top and right perspective view of a cutting blade about to cut tow material fed through a passageway of the cutting apparatus of FIG. 1.

As seen in FIG. 2, the cutting blade 30 comprises a body 44 made of stainless steel, carbide material or the like. In one example, the cutting blade 30 may comprise a one-piece steel body 44. In another example, the body 44 may be made of high speed steel. The body 44 may have a thin Physical Vapor Deposition PVD (sputter) coating that produces a coefficient of friction of between about 0.3 and about 0.5 between the surface of the body 44 and the surface 38 of the anvil 22. The PVD coating may range from about 2800 HV to about 3500 HV. The body 44 includes a distal portion 46 that is brazed to a proximal portion 47. The distal portion 46 may be made of a tungsten carbide material with a ten percent cobalt binder, or alternatively, stainless steel, carbide material ort the like. A titanium nitride (TiN) coating 48 may coat the distal portion 46 to additionally protect the distal portion 46. Instead of the TiN coating, the distal portion 46 may be coated with alternative coatings. These alternative coatings may include suitable coatings for uncured carbon fiber tows and PVD Sputter, including nano multi-layer High Impulse Magnetron Sputtering (HiPIMS) coatings such as for example, Aluminum Chromium Nitride and Aluminum Titanium Silicon Nitride. The body 44 also includes a top face 50, bottom face 52 (FIG. 3), right longitudinal side 54, left longitudinal side 56 (FIG. 6) opposite the right longitudinal side 54, and distal and proximal sides 58, 60. The body includes curved tines 62 at the proximal side 60 that have aligned lateral openings 64 for receiving a pivot pin 65 (FIG. 6) or other connector to pivotally connect the body 44 to the cutting base 32.

Figure 3:
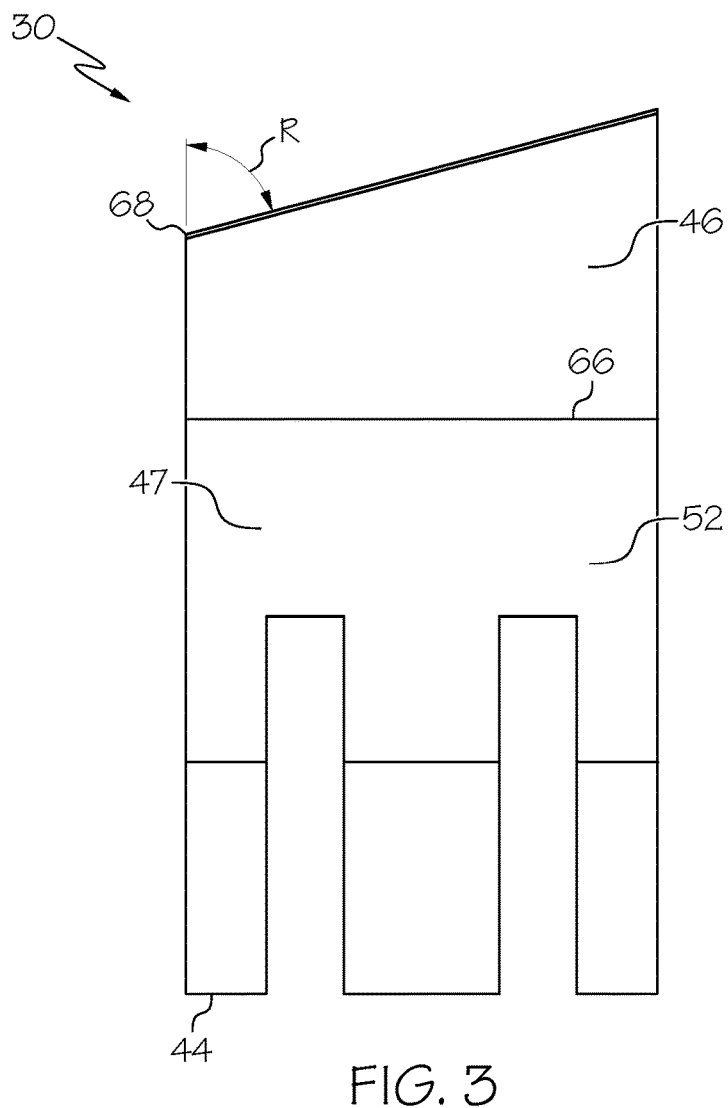
FIG. 3 is a bottom view of the cutting blade of the cutting apparatus of FIG. 1.
Figure 4:
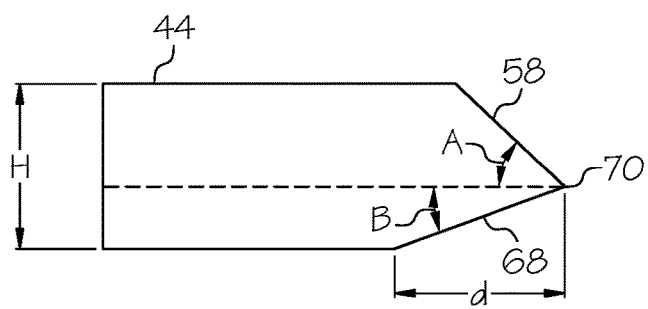
FIG. 4 is a schematic side view of a portion of a cutting blade that is similar to that shown in FIG. 2, but with different dimensions.
Figure 5:
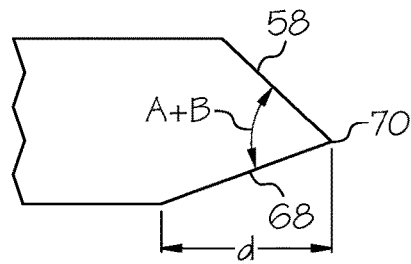
FIG. 5 is a schematic side view of a portion of another cutting blade that is similar to that shown in FIG. 2, but with different dimensions.

As seen in FIG. 3, the bottom face 52 of the body includes a contact portion 66 and a distal offset portion 68. The contact portion 66 contacts the upper surface 38 of the anvil 22 and the distal offset portion 68 angles or slopes upwardly going from the contact portion to a cutting edge 70 (i.e. angles upwardly from the proximal to distal direction relative to the cutting blade 30) at a predetermined angle B (FIGS. 4 and 5). The distal side 58 and distal offset portion 68 define a wedge-shaped structure. The intersection of the distal offset portion 68 of the bottom face 52 and the distal side 58 defines the cutting tip or edge 70 that cuts the tow material. The distal side 58, distal offset portion 68, and cutting edge 70 angle or slope toward the proximal side 60 going from the right longitudinal side 54 to the left longitudinal side 56 at a suitable relief angle R (FIG. 3) such as seventy-five degrees. In an alternative arrangement, the distal side 58, distal offset portion 68, and cutting edge 70 may angle or slope toward the proximal side 60 going from the left longitudinal side 56 to the right longitudinal side 54 at the relief angle R.

As illustrated in FIGS. 2, 4 and 5-7, the distal side 58 also angles or slopes downwardly going from the top face 50 toward the cutting edge 70 (i.e. angles downwardly from the proximal to distal direction relative to the cutting blade 30) at a predetermined back rake angle A (FIGS. 4 and 5). This back rake angle A may be 45 degrees. The distal offset portion 68 of the bottom face 52 and cutting edge 70 do not contact the upper surface 38 of the anvil 22 during the cutting of the tow material to form the tow 41. This configuration 'lifts' or spaces the distal offset portion 68 and the cutting edge 70 of the blade 30 away from the upper surface 38 of the anvil 22, thereby preventing direct interaction between the sharp cutting edge 70 and the rough upper surface 38 of the anvil 22 during the cutting process. This will allow the cutting edge 70 of the cutting blade 30 to remain sharp through many more cycles, significantly improving both the blade life and overall machine efficiencies. Also, since the contact surface of the cutting blade with the anvil is reduced when cutting blade 30 moves, the "drag force" on the blade is reduced.

Figure 6:
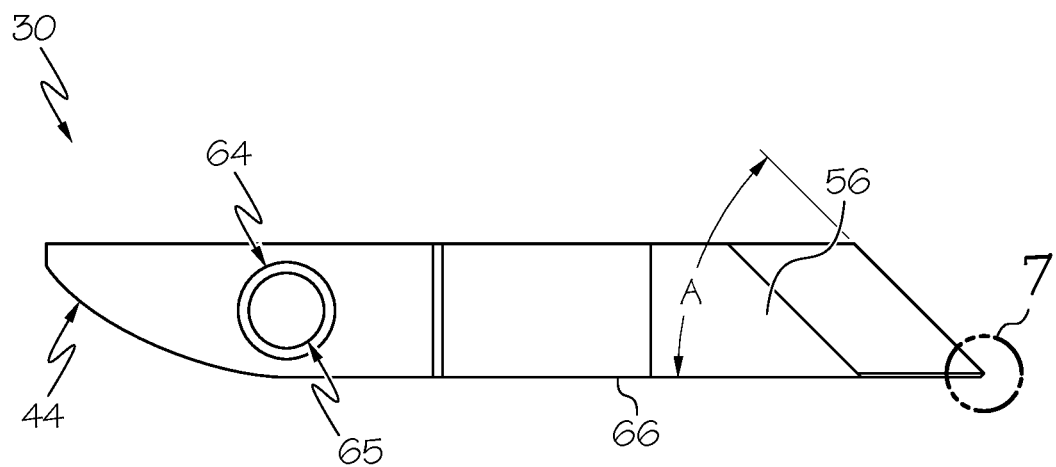
FIG. 6 is a left side view of the cutting blade shown in FIG. 2.
Figure 7:
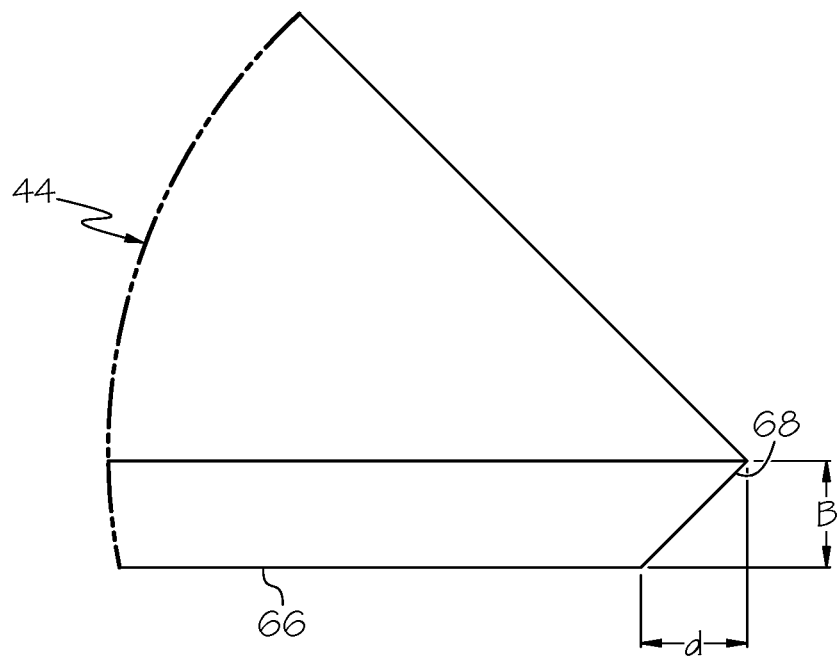
FIG. 7 is an enlarged portion of the cutting blade of FIG. 6 (as indicated in FIG. 6)

As shown in FIGS. 6 and 7, for an exemplary cutting blade 30 having a height or thickness H (FIG. 4) of about 0.135 inches, a length of about 0.95 inches, a width of about 0.498 inches, and an angle A of about 45 degrees, the angle B between the upper surface 38 of the anvil 22 and distal offset portion 68 may be about 45 degrees, and the longitudinal distance d (with respect to the body 44) between the cutting edge 70 and the contact portion 66 of the bottom face 52 that contacts the anvil upper surface 38 is about 0.005 inches. The sum of the angles A, B define a compound or blade point angle of the cutting edge having a value of ninety degrees. However, it should be noted that the angles and longitudinal distance d may have a variety of values (as illustrated in FIGS. 4-6) for a variety of reasons such as, for example, to obtain the optimal cutting edge strength and increase cutting blade life. For example, the width may be between about 0.25 and about 2 inches.

It should also be noted that as the longitudinal distance d increases there will be less contact area between the bottom face 52 of the cutting blade 30 and the rear anvil 22, particularly near the rectangular passageways 42 that are machined into the rear anvil 22 for the tow 41 to travel through. The areas of the upper surface 38 surrounding these passageways 42 tend to experience significant wear during the fiber placement process. Reduced contact in these rough regions will lead to reduced resistance to cut forces and improvements in the reliability of the cutting blades 30, as there will be less blade wear and chipping. Studies have shown that this contact region may extend up to approximately 0.160" into the contact portion 66 of the bottom face 52 of the cutting blade 30 (measured from the cutting edge). A longitudinal distance d or offset of 0.200 inches will therefore be more than sufficient to eliminate the contact between the cutting blade 30 and the rough or worn areas around the tow-travel passageways 42. To be suitable for this situation, the range for the longitudinal distance, d, may be between about 0.005 and about 0.25 inches.

In one example illustrated in FIGS. 4 and 5, a blade 30 may have a thickness H of 0.135 inches, a length of 0.95 inches, a width of 0.498 inches, a compound or blade point angle between about 60 and about 65 degrees, and a longitudinal distance between about 0.005 and about 0.25 inches. The compound or blade point angle of about 60-65 degrees may comprise an angle A of about 45 degrees and an angle B between about 15 and about 20 degrees. Other exemplary cutting blades 70 may have blade point angles between about 45 and about 65 degrees or between about 60 and about 90 degrees. In an alternative arrangement, the distal offset portion 68 and cutting edge 70 may be parallel to the contact portion 66 and upper surface 38 (thereby having an angle B of about zero degrees), but raised above the contact portion 66 and upper surface 38 to be free of contact with the upper surface 38 when the cutting blade 30 slides along the upper surface 38. In another alternative arrangement, the distal offset portion 68 may angle or slope downwardly going from the contact portion to the cutting edge 70, but still be raised (along with the cutting edge 70) above the contact portion 66 such that the distal offset portion 68 and cutting blade 70 do not contact the upper surface 38 when the cutting blade 30 slides along the upper surface 38.

It should also be noted that in addition to the details discussed above, the carbide grade may also affect cutter blade life and reliability. Selection of a grade of carbide for the cutting blade 30 which performs well in impact loading conditions may comprise a GUHRING DK 120 (Iso 513 Grade K05/K10) and DK 250 (Iso 513 Grade K20) or equivalent. The cutting blade 30 may have sub-micron average carbide grains sizes. In other words, the carbide grain size may be one micron or less.

Figure 8:
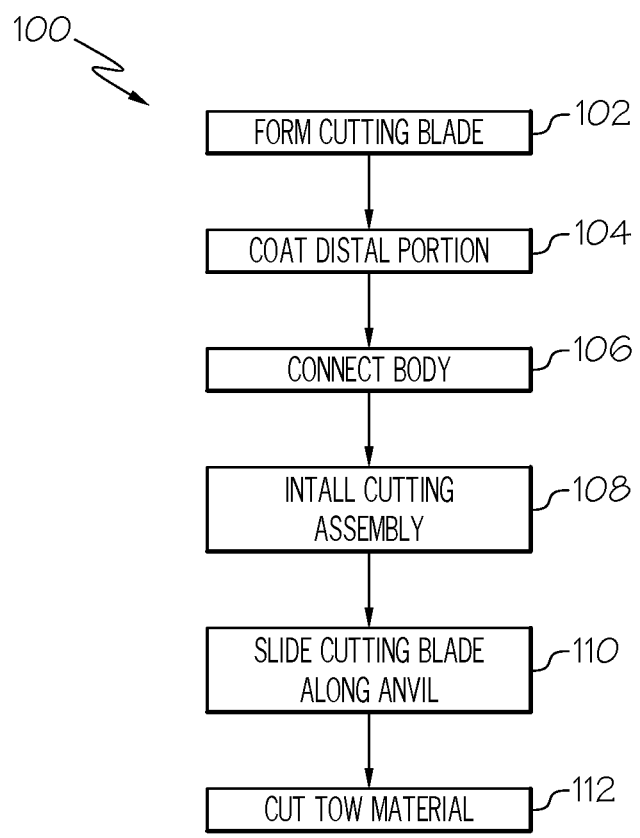
FIG. 8 is a flow diagram of a method for cutting tow material to form a tow using the cutting blade of FIG. 2.

FIG. 8 illustrates a method 100 for cutting the tow material to form the tow 41 using the cutting blade 30. In step 102, the body 44 of the cutting blade 30 is formed. This step includes brazing the distal portion 46 to the proximal portion 47 of the body 44. This step would be eliminated for a one-piece steel cutting body 44. Then in step 104, the distal portion 46 is coated with the titanium nitride (TiN) coating 48 to additionally protect the distal portion 46. Instead of the TiN coating, the distal portion 46 may be coated with alternative coatings. These alternative coatings may include suitable coatings for uncured carbon fiber tows and PVD Sputter, including nano multi-layer High Impulse Magnetron Sputtering (HiPIMS) coatings such as for example, Aluminum Chromium Nitride and Aluminum Titanium Silicon Nitride. Then, in step 106, the body 44 is pivotally connected to the cutting base 32 and roller 34. Then, in step 108, the cutting assembly 26 is installed on a longitudinal end 28 of the anvil 22. Then, in step 110, the AFP machine 20 is operated such that the cutting blade 30 is guided through the slot 36 and the contact portion 66 of the cutting body 44 contacts and slides along the upper surface 38 of the anvil 22 toward a rectangular passageway 42 of the anvil 22, while the offset distal portion 68 and cutting edge 70 is free of contact with the upper surface 38 of the anvil 22. In step 112, the tow material is fed through the corresponding passageway 42 as the contact portion 66 contacts and slides along the upper surface 38 of the anvil 22 toward the passageway 42 until the cutting edge 70 cuts the tow material at a predetermined length to form the tow 41.

FIGS. 9-14 illustrate another embodiment of a cutting apparatus. Elements in the embodiment illustrated in FIGS. 9-14 that are similar in structure and function to the embodiment illustrated in FIGS. 1-8 will be described with the same reference numbers. The cutting apparatus may be an AFP machine. However, it is contemplated that this embodiment can be incorporated into other cutting machines that include cutting blades for cutting materials such as Automated Tape Laying (ATL) Machines.

Figure 9:
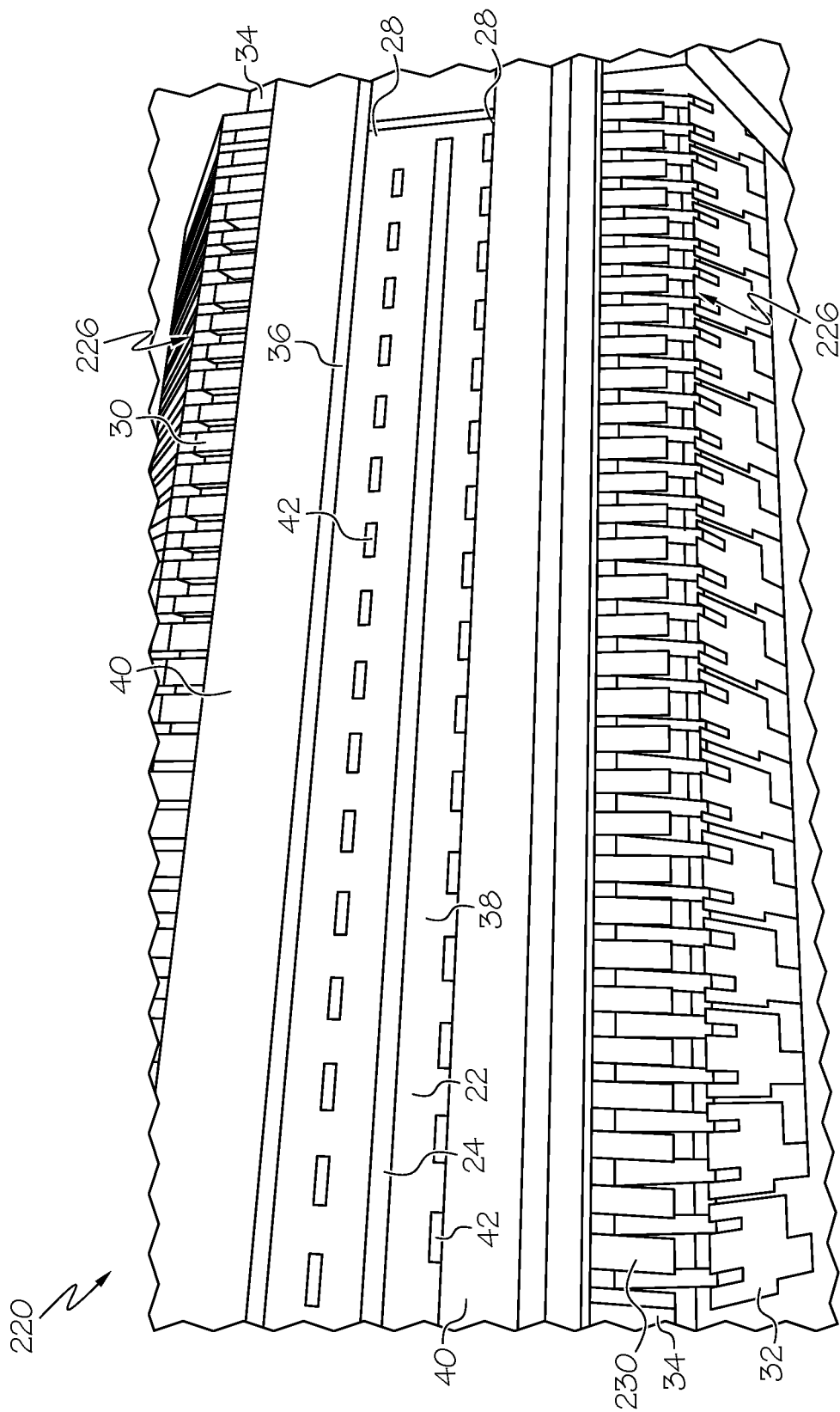
FIG. 9 is a top and rear perspective view of a cutting apparatus according to another embodiment.

Referring to FIG. 9, the AFP machine 220 comprises a rear anvil 22 that has a longitudinal slit 24 in the center of the anvil 22. The AFP machine 220 further comprises a pair of cutting assembles 226 located on opposite longitudinal ends 28 of the anvil 22. Each cutting assembly 226 includes a cutting blade 230 that is pivotally connect to a cutting base 32. Each cutting assembly 226 is affixed to rollers 34 that guide the cutting blade 230 through a slot 36 defined by the upper surface 38 of the anvil 22 and a shield 40 located over the longitudinal end 28 of the anvil 22. Two rows of rectangular shaped passageways 42 are formed in the anvil 22 and extend through the upper surface 38. Each row of passageways 42 is located between the shield 40 and the slit 24. Carbon fiber composite tow material (FIG. 2) is fed through the passageways 42 and is cut in predetermined lengths by the cutting blades 230 as they slide through the slot 36 along the upper surface 38 of the anvil 22 to form tows 41.

Figure 10:
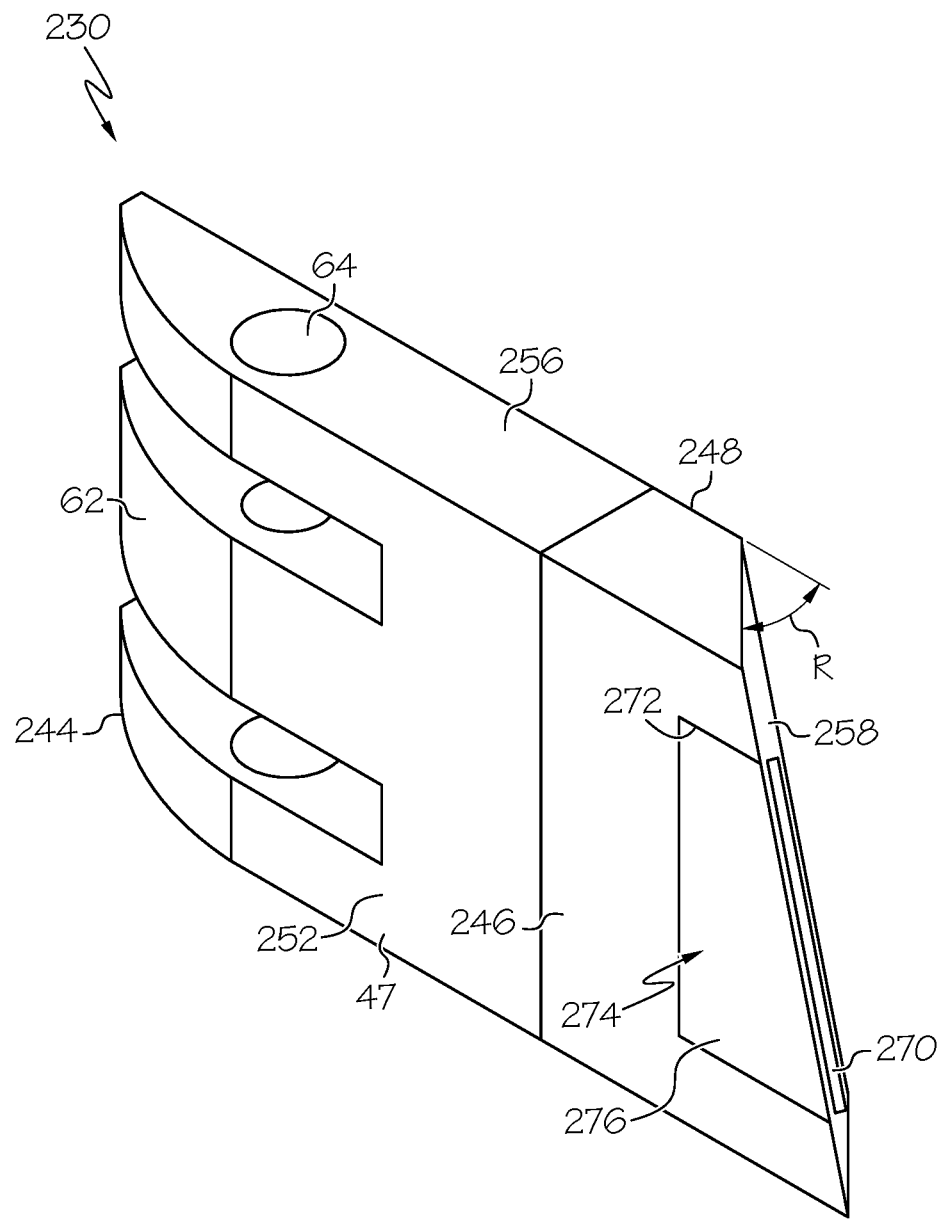
FIG. 10 is a bottom and left side perspective view of a cutting blade of the cutting apparatus of FIG. 9.
Figure 11:
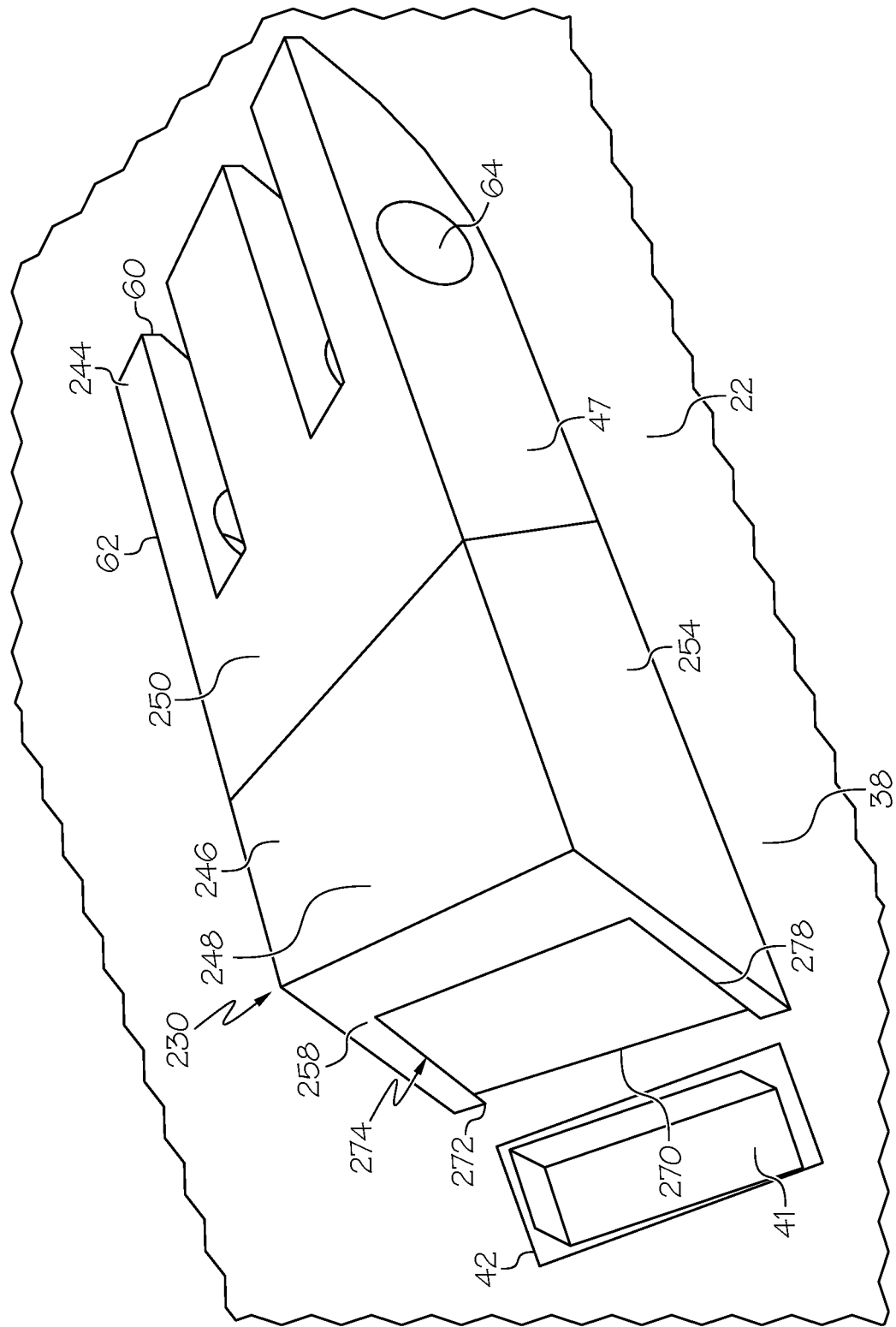
FIG. 11 is a top and right perspective view of the cutting blade about to cut tow material fed through a passageway of the cutting apparatus of FIG. 9.

As seen in FIGS. 10 and 11, the cutting blade 230 comprises a body 244 made of stainless steel, carbide material or the like. In one example, the cutting blade 230 may comprise a one-piece steel body 244. In another example, the body 244 may be made of high speed steel. The body 244 may have a thin Physical Vapor Deposition PVD (sputter) coating that produces a coefficient of friction of between about 0.3 and about 0.5 between the surface of the body 44 and the surface 38 of the anvil 22. The PVD coating may range from about 2800 HV to about 3500 HV. The body 244 includes a distal portion 246 and a proximal portion 47. In one example, the distal portion 246 may be brazed to the proximal portion 47. The distal portion 246 may be made of a tungsten carbide material with a ten percent cobalt binder, or alternatively, stainless steel, carbide material or the like. A titanium nitride (TiN) coating 248 may coat the distal portion 246 to additionally protect the distal portion 246. Instead of the TiN coating, the distal portion 46 may be coated with alternative coatings. These alternative coatings may include suitable coatings for uncured carbon fiber tows and PVD Sputter, including nano multi-layer High Impulse Magnetron Sputtering (HiPIMS) coatings such as for example, Aluminum Chromium Nitride and Aluminum Titanium Silicon Nitride. However, since the insert 274 is cutting the tow material, the distal portion 246 may alternatively not be coated with a nitride (TiN) coating or other suitable coating 248. The body 244 also includes a top face 250, bottom face 252 (FIG. 11), right longitudinal side 254, left longitudinal side 256 (FIG. 12) opposite the right longitudinal side 254, and distal and proximal sides 258, 60. The body includes curved tines 62 at the proximal side 60 that have aligned lateral openings 64 for receiving a pivot pin 65 (FIG. 12) or other connector to pivotally connect the body 244 to the cutting base 32.

Figure 12:
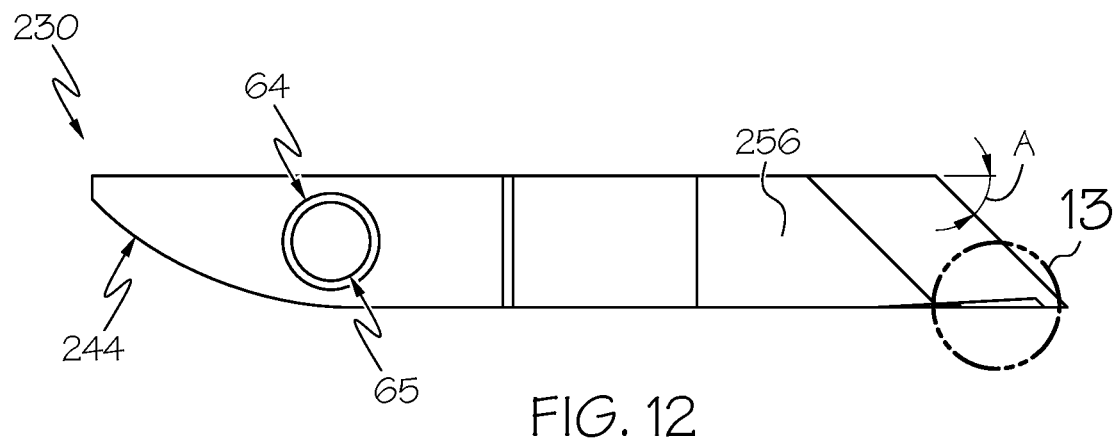
FIG. 12 is a left side view of the cutting blade shown in FIG. 9.
Figure 13:
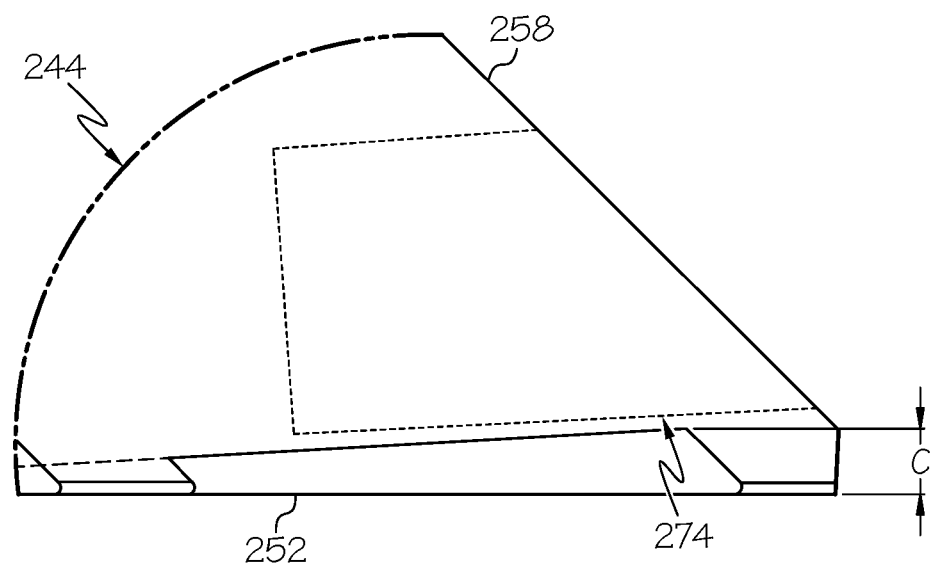
FIG. 13 is an enlarged portion of the cutting blade of FIG. 12 (as indicated in FIG. 12 and including dashed lines indicating hidden elements)

A recess 272 is formed in the bottom face 252 and distal side 258 of the body 244 and receives a similarly shaped insert 274. The insert 274 may be brazed to the body 244 at the recess 272. When disposed and secured inside the recess 272, the insert 274 includes a bottom face 276 (FIG. 10) that is parallel to the bottom face 252 of the body 244 and located a further distance (FIG. 13) into the recess 272 than the bottom face 252 of the body 244 that contacts the surface 38. That is the bottom face 276 of the insert 274 is raised at a predetermined height C (FIG. 13) from the bottom face 252 of the body 244 that contacts the surface 38 (when the cutting blade 230 is on the anvil 22). This results in a gap (FIGS. 11 and 13) between the upper surface 38 of the anvil 22 and the bottom face 276 of the insert 274 when the bottom face 252 of the body 244 contacts and slides along the upper surface 38 of the anvil 22 to cut the tow 41. The insert 274 includes a distal side 278 (FIG. 11) that is generally flushed with the distal side 258 of the body 244. The intersection of the distal side 278 of the insert 274 and the bottom face 276 of the insert 274 defines a cutting tip or edge 270. The cutting edge 270 is flushed with the surface of the bottom face 276 of the insert 274. The recess and insert may be configured to avoid or minimize the collection of resin and debris on them during the sliding of the cutting blade 230. The distal side 278 of the insert 274 and cutting edge 270 have a width that is slightly wider than the width of the tow 41 that it cuts. The tow 41 may have a width of about 0.250 inches. The distal sides 258, 278, distal edge of the bottom face 252, and cutting edge 270 angle or slope toward the proximal side 60 going from the right longitudinal side 254 to the left longitudinal side 256 at a suitable relief angle R (FIG. 10) such as seventy-five degrees. In an alternative arrangement, the distal sides 258, 278, distal edge of the bottom face 252, and cutting edge 27 may angle or slope toward the proximal side 60 going from the left longitudinal side 256 to the right longitudinal side 254 at the relief angle R. The distal sides 258, 278 also angle or slope downwardly going from the top face 250 toward the cutting edge 270 (i.e. angles downwardly from the proximal to distal direction relative to the cutting blade 30) at a predetermined angle A (FIG. 12). This angle A may be 45 degrees.

When the cutting blade 230 cuts the tow material to form the tow 41, the cutting edge 270 of the insert 274 only contacts the tow material to cut it. Since the gap ensures that the bottom face 276 of the insert 274 and cutting edge 270 do not contact the upper surface 38 of the anvil 22 during the cutting of the tow 41, the rate of wear of the cutting edge 270 is reduced with a subsequent reduction in impact contact chipping of the cutting edge 270 occurring against the upper surface 38 of the anvil 22. The gap also reduces the contact surface of the cutting blade 230 with the anvil when the cutting blade 230 moves, and thus reduces "drag force" on the blade. The predetermined height C may be about 0.002 inches or about 0.010 inches, or about 0.100 inches, or between about 0.002 and about 0.100 inches. The insert 274 may be made of a polycrystalline diamond (PCD), which has a hardness that is greater than the hardness of the material of the distal portion 246 of the body 244. The PCD may have a Vickers Hardness of 10,000 HV. Alternatively, the insert 274 may include (or may be) a chemical vapor deposition (CVD) diamond coating. The increased hardness/durability of the PCD insert (relative to the PVD coatings) increases the life of the cutting edge and reduces the number of cut failures at splice locations in the tow material. In an alternative arrangement, the insert and distal portion may be formed in one piece that may be made of a tungsten carbide material with a ten percent cobalt binder, or alternatively, stainless steel, carbide material or the like. A titanium nitride (TiN) coating 248 may coat the insert, or the insert and distal portion 246, to additionally protect the distal portion 246 and insert in this alternative arrangement.

It should also be noted that in addition to the details discussed above, the carbide grade for the blade body also affects cutter blade life and reliability. Selection of a grade of carbide which performs well in impact loading conditions may comprise a GUHRING DK 120 (Iso 513 Grade K05/K10) and DK 250 (Iso 513 Grade K20) or equivalent. The cutting blade 230 may have sub-micron average carbide grains sizes. The carbide grain size may be one micron or more.

Figure 14:
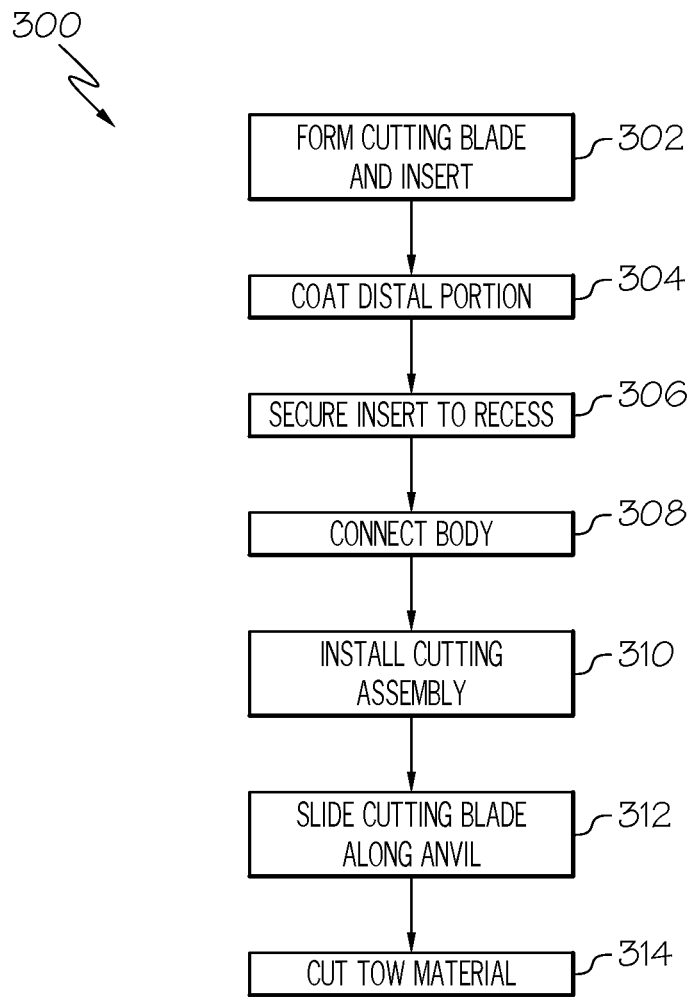
FIG. 14 is a flow diagram of a method for cutting tow material to form a tow using the cutting blade of FIG. 11.

FIG. 14 illustrates a method 300 for cutting the tow material to form the tow 41 using the cutting blade 230. In step 302, the insert 274 and the body 244 of the cutting blade 230 is formed with the recess 272. This step includes brazing the distal portion 246 to the proximal portion 47 of the body 244. This step would be eliminated for a one-piece steel cutting body 244. Then, in step 304, the distal portion 246 is coated with the titanium nitride (TiN) coating 248 or other suitable coating to additionally protect the distal portion 246. However, since the insert 274 is cutting the tow material, this step may alternatively be eliminated. Then in step 306, the insert 274 is secured into the recess 272 such that the bottom face 276 of the insert 274 is located a further distance into the recess 272 than the bottom face 276 of the body 244. Then, in step 308, the body 244 is pivotally connected to the cutting base 32 and roller 34. Then, in step 310, the cutting assembly 226 is installed on a longitudinal end 28 of the anvil 22. Then, in step 312, the AFP machine 220 is operated such that the cutting blade 230 is guided through the slot 36 and the bottom face 252 of the cutting body 244 contacts and slides along the upper surface 38 of the anvil 22 toward a rectangular passage way 42 of the anvil 22, while the bottom face 276 of the insert 274 and cutting edge 270 is free of contact with the upper surface 38 of the anvil 22. In step, 314, the tow material is fed through the corresponding passageway 42 as the bottom face 252 of the body 244 contacts and slides along the upper surface 38 of the anvil 22 toward the passageway 42 until the cutting edge 270 cuts the tow material at a predetermined length to form the tow 41. Alternative cutting blades with inserts may have the cutting edge 270 also included on portions of the distal edge of the body 244 adjacent the insert.

Figure 15:
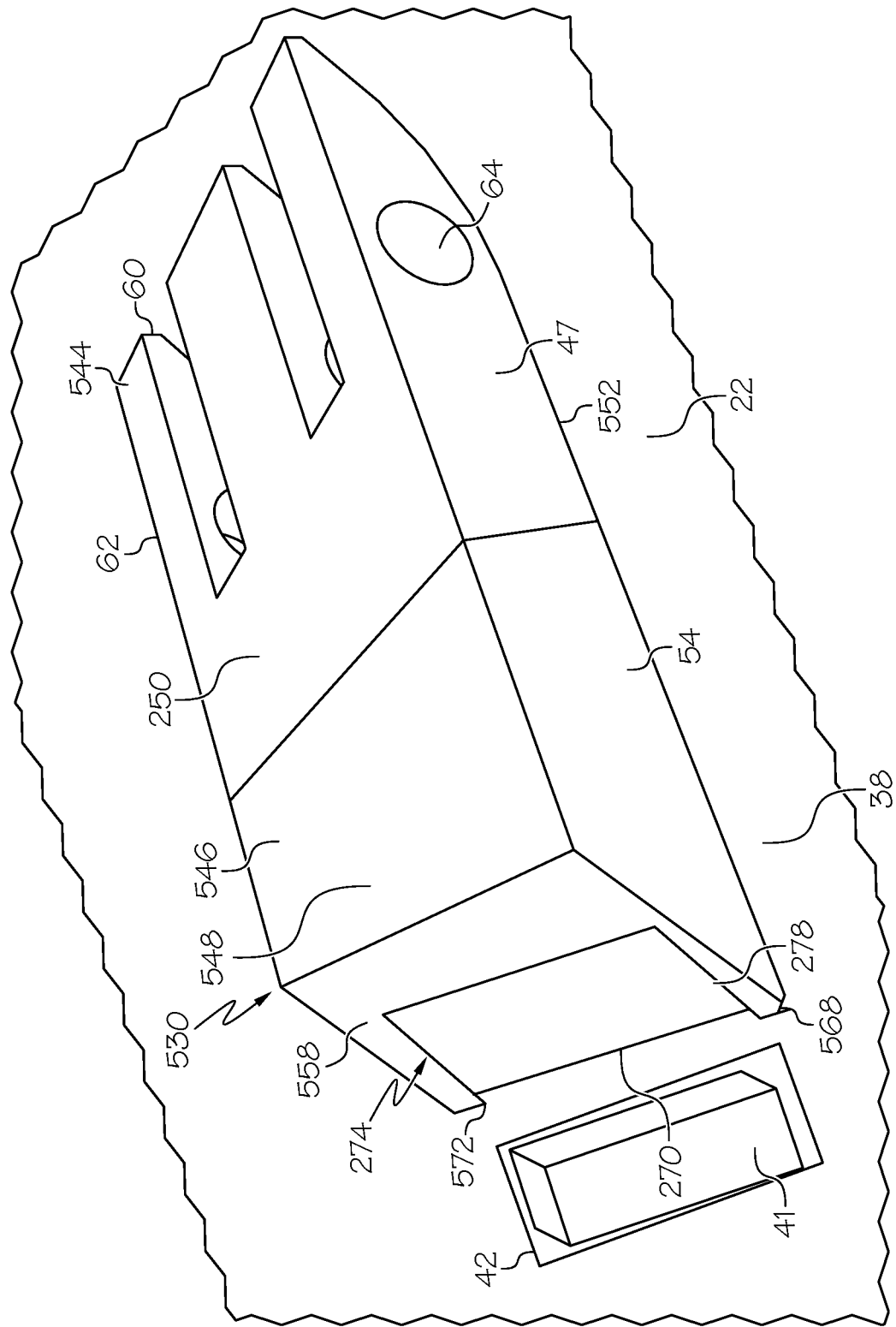
FIG. 15 is a top and right perspective view of a cutting blade about to cut tow material fed through a passageway of a cutting apparatus according to another embodiment.

FIG. 15 illustrates an alternative cutting blade 530 that can be used on the cutting machines of the embodiments of FIGS. 1-14. Elements in the cutting blade 530 illustrated in FIG. 15 that are similar in structure and function to the cutting blades illustrated in FIGS. 1-14 will be shown in FIG. 15 and/or described with the same reference numbers. As illustrated in FIG. 15, the cutting blade 530 comprises a body 544 made of stainless steel, carbide material or the like.

In one example, the cutting blade 530 may comprise a one-piece steel body 544. In another example, the body 544 may be made of high speed steel. The body 544 may have a thin Physical Vapor Deposition PVD (sputter) coating that produces a coefficient of friction of between about 0.3 and about 0.5 between the surface of the body 544 and the surface 38 of the anvil 22. The PVD coating may range from about 2800 HV to about 3500 HV. The body 544 includes a distal portion 546 and a proximal portion 47. In one example, the distal portion 546 may be brazed to the proximal portion 47. The distal portion 546 may be made of a tungsten carbide material with a ten percent cobalt binder, or alternatively, stainless steel, carbide material or the like. A titanium nitride (TiN) coating 548 or other suitable coating may coat the distal portion 546 to additionally protect the distal portion 546. However, since the insert 274 is cutting the tow material, the distal portion 246 may alternatively not be coated with a nitride (TiN) coating 548. The cutting blade 530 may include a combination of the above-mentioned embodiments in which the body 544 has the contact portion 66 that contacts the upper surface 38 of the anvil 22 and a distal offset portion 568 that angles or slopes upwardly going from the proximal to distal direction relative to the cutting blade 530 at a predetermined angle. The body 544 also has a recess 572 formed in the distal side 558 and bottom face 552 of the body 544 that receives the similar shaped insert 274 with the bottom face 276 of the insert 274 being parallel to the contact portion 66. The insert 274 may be brazed to the body 544 at the recess 572. In this alternative arrangement, the insert 274 and the distal offset portion 568 would not contact the upper surface 38 of the anvil 22 during the cutting of the tow material to form the tow 41.

Figure 16:
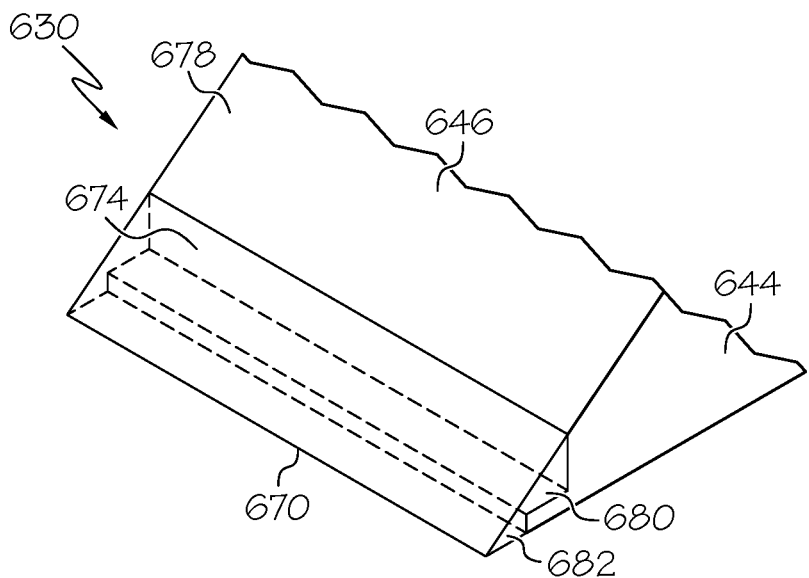
FIG. 16 is a top and right perspective view of a portion of a cutting blade according to another embodiment.
Figure 17:
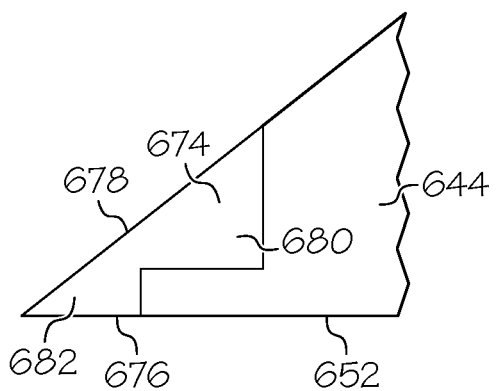
FIG. 17 is a right side view of a portion of the cutting blade of FIG. 16.

FIGS. 16-19 illustrate alternative cutting blades 630, 730 that can be used on the cutting machines of the embodiments of FIGS. 1-15. Elements in the cutting blades 630, 730 illustrated in FIGS. 16-19 that are similar in structure and function to the cutting blades illustrated in FIGS. 1-15 will be shown in FIGS. 16-19 and/or described with the same reference numbers. As illustrated in FIG. 16, the cutting blade 630 comprises a body 644 made of stainless steel, carbide material or the like. In one example, the cutting blade 630 may comprise a one-piece steel body 644. In another example, the body 644 may be made of high speed steel. The body 644 may have a thin Physical Vapor Deposition PVD (sputter) coating that produces a coefficient of friction of between about 0.3 and about 0.5 between the surface of the body 644 and the surface 38 of the anvil 22. The PVD coating may range from about 2800 HV to about 3500 HV. The body 644 includes a distal portion 646 and a proximal portion 47. In one example, the distal portion 646 may be brazed to the proximal portion 47. The distal portion 646 may be made of a tungsten carbide material with a ten percent cobalt binder, or alternatively, stainless steel, carbide material or the like. A titanium nitride (TiN) coating 648 or other suitable coating may coat the distal portion 646 to additionally protect the distal portion 646. However, since the insert 674 is cutting the tow material, the distal portion 646 may alternatively not be coated with a nitride (TiN) coating 648. The body 644 has a recess 672 (FIG. 19) formed in the distal side 658 and bottom face 652 of the body 644 that receives a similar shaped insert 674.

Figure 18:
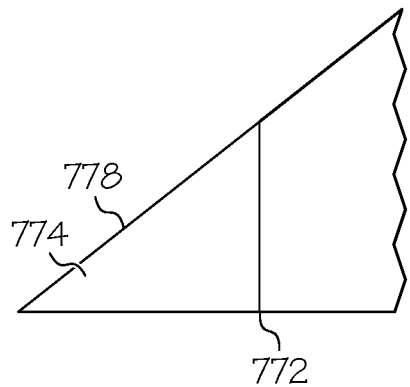
FIG. 18 is a right side view of a portion of a cutting blade of an alternative arrangement.
Figure 19:
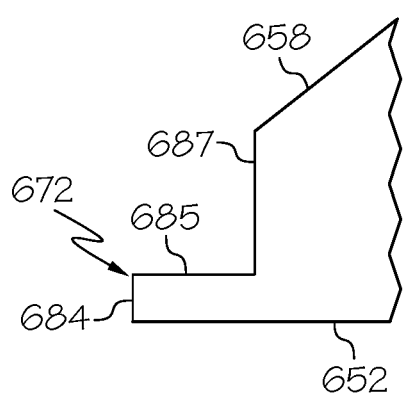
FIG. 19 is a right side view of a portion of the cutting blade of FIG. 16 with the insert removed for illustrative purposes.

The recess 672 and insert 674 extend along the entire width of the distal portion 646 of the cutting blade 630. The insert 674 includes an upper portion 680 and a lower portion 682 that is located distally from the upper portion 680. The recess 672 defines a step that has a vertical edge 684, horizontal face 685, and riser 687 as illustrated in FIG. 19. The lower portion 682 is brazed to the surface of the vertical edge 684. The upper portion 680 is brazed to the horizontal face 685 and the surface of the riser 687. In an alternative arrangement as illustrated in FIG. 18, an insert 774 provided that is similar to the insert 674 except that the insert 774 does not include the upper portion, and a recess 772 is provided that is similar to the recess 672 except that the recess 772 comprises essentially the vertical edge 684, of which the insert 774 is brazed to. The lower portion 682 includes a bottom face 676 that is parallel to a bottom face 652 of the cutting body 644. The bottom face 676 is spaced from the upper surface 38 at the predetermined height C (FIG. 13), which results in a gap between the upper surface 38 and the bottom face 676. The insert 674, 774 includes a distal side 678, 778 that is generally flushed with the distal side 658 of the cutting body 644. The intersection of the distal side 678, 778 and the bottom face 676 defines a cutting tip or edge 670. The cutting edge 670 is flushed with the surface of the bottom face 676. The insert 674, 774 does not contact the upper surface 38 of the anvil 22 during the cutting of the tow material to form the tow 41.

Figure 20:
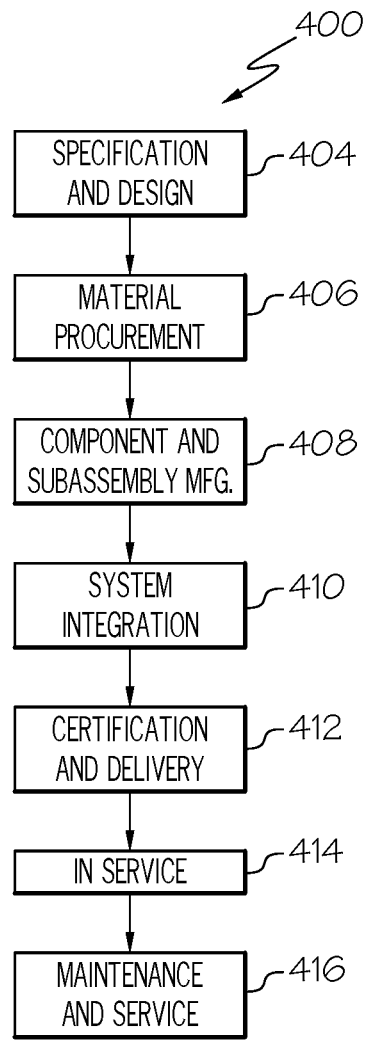
FIG. 20 is flow diagram of an aircraft manufacturing and service methodology.
Figure 21:
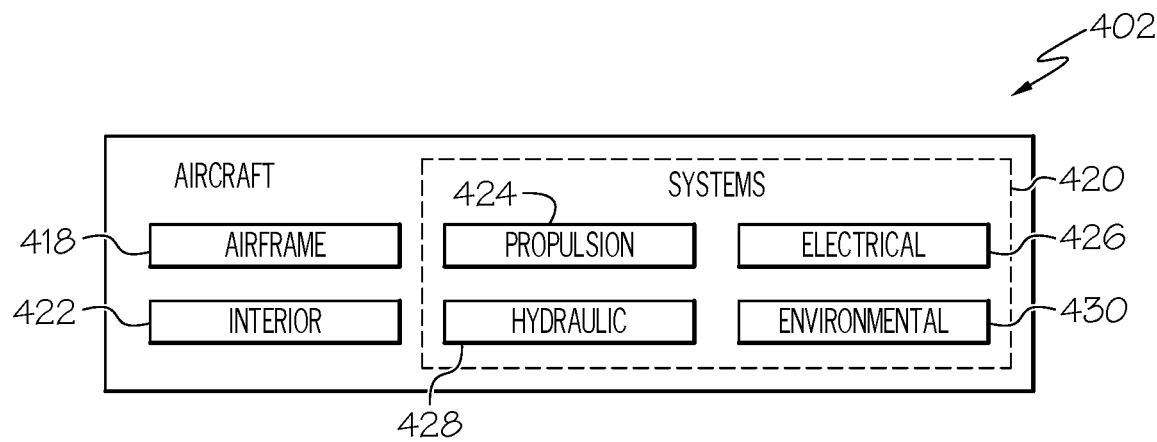
FIG. 21 is a block diagram of an aircraft.

Examples of the disclosure may be described in the context of an aircraft manufacturing and service method 400, as shown in FIG. 20, and an aircraft 402, as shown in FIG. 21. During pre-production, the aircraft manufacturing and service method 400 may include specification and design 404 of the aircraft 402 and material procurement 406. During production, component/subassembly manufacturing 408 and system integration 410 of the aircraft 402 takes place. Thereafter, the aircraft 402 may go through certification and delivery 412 in order to be placed in service 414. While in service by a customer, the aircraft 402 is scheduled for routine maintenance and service 416, which may also include modification, reconfiguration, refurbishment and the like.

Each of the processes of method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, single individual, and so on. The proposed application could be used on many different materials and surface finishes across many industries in addition to the aerospace industry.

As shown in FIG. 21, the aircraft 402 produced by example method 400 may include an airframe 418 with a plurality of systems 420 and an interior 422. Examples of the plurality of systems 420 may include one or more of a propulsion system 424, an electrical system 426, a hydraulic system 428, and an environmental system 430. Any number of other systems may be included.

Since the cutting edges 70, 270, 670 of the embodiments do not contact the surface of the anvil 22, the rate of wear of the cutting edge sliding against the upper surface 38 is reduced with a subsequent reduction in impact contact chipping of the cutting edge occurring against the upper surface 38 of the anvil 22. Also, since the contact surface of the cutting blade with the anvil is reduced when the cutting blade moves, the "drag force" on the blade is reduced. In addition, the PVD coating on the blade body reduces the friction between the surface of the anvil and the contact surface of the blade. These features increase the reliability of the cutting blades (reducing the wear on them), thereby enabling a reduction in the number of failed cuts and the resulting cutter-related machine downtime. Fiber placement process efficiency is also improved and potentially allows for cost savings (as the life of the new blade design is expected to exceed the life of the current blade).

Although various embodiments of the disclosed apparatus and methods for cutting materials have been shown and described, modifications may occur to those skilled in the art upon reading the specification. The present application includes such modifications and is limited only by the scope of the claims.

What is claimed is:

1. A cutting apparatus comprising:
an anvil comprising at least one passageway that extends through a surface of said anvil; and
a cutting blade configured to slide along said surface of said anvil to cut tow material fed through said passageway, wherein said cutting blade has a first end and a second end, opposite to said first end, and comprises:
a cutting edge, located at said second end;
a bottom face, extending from said first end; and
a bottom-cutting face, extending from said bottom face to said cutting edge; and
wherein:
said bottom face is configured to contact said surface of said anvil when said cutting blade slides along said surface to cut said tow material configured to extend through said passageway; and
said bottom-cutting face is spaced away from said anvil such that said cutting edge does not contact said surface when said cutting blade slides along said surface to cut said tow material.

2. The cutting apparatus of claim 1 wherein said cutting blade further comprises:
a top face, extending from said first end and opposite to said bottom face; and
a top-cutting face, extending from said top face to said cutting edge; and wherein:
said bottom-cutting face extends at a first acute angle relative to a cutting-edge plane that is parallel to said bottom face and that contains said cutting edge; and
said top-cutting face extends at a second acute angle relative to said cutting-edge plane.

3. The cutting apparatus of claim 2 wherein a sum of said first acute angle and said second acute angle is between about 60 degrees and about 65 degrees.

4. The cutting apparatus of claim 3 wherein said second acute angle is between about 15 degrees and about 20 degrees.

5. The cutting apparatus of claim 1 wherein said cutting blade further comprises:
a first side face, extending from said first end to said second end; and
a second side face, extending from said first end to said second end and opposite to said first side face; and
said cutting edge extends between said first side face and said second side face; and
said cutting edge extends at a relief angle relative to a relief plane that is perpendicular to said cutting-edge plane and that passes through said cutting edge.

6. The cutting apparatus of claim 1 wherein said bottom-cutting face has a length between about 0.005 inches and about 0.25 inches.

7. The cutting apparatus of claim 1 wherein said cutting blade comprises a carbide material having a grade of carbide comprising a GUHRING DK 120 (Iso 513 Grade K05/K10) and DK 250 (Iso 513 Grade K20), and wherein a carbide grain size is at least one micron.

8. The cutting apparatus of claim 1 wherein said cutting blade comprises stainless steel.

9. The cutting apparatus of claim 1 wherein said cutting blade comprises tungsten carbide.

10. A cutting apparatus comprising:
a cutting blade configured to slide along a surface of an anvil to cut tow material, wherein said cutting blade has a first end and a second end, opposite to said first end, and comprises:
a cutting body, comprising:
a bottom face, extending from said first end; and
a recess, formed in said cutting body at said second end; and
an insert, coupled to said cutting body inside said recess and comprising:
a cutting edge, located at said second end; and
a bottom-cutting face, extending from said bottom face of said cutting body to said cutting edge; and
wherein:
said bottom face of said cutting body is configured to contact said surface of said anvil when said cutting blade slides along said surface to cut said tow material;
said bottom-cutting face of said insert is spaced away from said anvil such that said cutting edge does not contact said surface of said anvil when said cutting blade slides along said surface to cut said tow material.

11. The cutting apparatus of claim 10 wherein:
said bottom face of said cutting body and said bottom-cutting face of said insert are parallel to each other; and
said bottom-cutting face of said insert is spaced away from said bottom face of said cutting body, in a direction perpendicular to said bottom face of said cutting body, a distance of between about 0.002 inches and about 0.10 inches.

12. The cutting apparatus of claim 10 wherein:
said cutting body further comprises a top face, extending from said first end and opposite to said bottom face;
said insert further comprises a top-cutting face, extending from said top face of said cutting body to said cutting edge; and
said top-cutting face of said insert extends at an acute angle relative to a cutting-edge plane that is parallel to said bottom face of said cutting body and that contains said cutting edge.

13. The cutting apparatus of claim 12 wherein said acute angle is about 45 degrees.

14. The cutting apparatus of claim 10 wherein said cutting body further comprises:
a first side face, extending from said first end to said second end; and
a second side face, extending from said first end to said second end and opposite to said first side face; and
wherein:
said cutting edge of said insert extends between said first side face and said second side face; and
said cutting edge extends at a relief angle relative to a relief plane that is perpendicular to said cutting-edge plane and that passes through said cutting edge.

15. The cutting apparatus of claim 10 wherein:
said anvil comprises at least one passageway that extends through said surface of said anvil;
said tow material is fed through said passageway by said automated fiber placement machine; and said bottom face of said cutting body slides along said surface of said anvil and said cutting edge of said insert cuts a portion of said tow material that extends through said passageway.

16. The cutting apparatus of claim 10 wherein said insert comprises a polycrystalline diamond.

17. A method of cutting tow material, said method comprising:

positioning a cutting blade relative to an anvil so that a bottom face of said cutting blade is in contact with a surface of said anvil and a cutting edge of said cutting blade is spaced away from said surface of said anvil;

feeding a tow material through a passageway formed in said anvil;

sliding said bottom face of said cutting blade along said surface of said anvil toward said passageway such that said cutting edge does not contact said surface of said anvil; and cutting said tow material at a predetermined length using said cutting edge, wherein said cutting blade has a first end and a second end, opposite to said first end;

a recess is formed in a cutting body of said cutting blade at said second end;

an insert is coupled to said cutting body within said recess and forms said cutting edge;

a bottom-cutting face of said insert extends from said cutting body to said cutting edge;

said bottom-cutting face of said insert is spaced away from said bottom face of said cutting blade in a direction perpendicular to said bottom face of said cutting body; and said bottom-cutting face of said insert does not contact said surface of said anvil when sliding said bottom face of said cutting blade along said surface of said anvil toward said passageway.

18. The method of claim 17 wherein:

said cutting edge is located at said second end of said cutting blade;

a bottom-cutting face of said cutting blade extends from said bottom face to said cutting edge at an acute angle relative to a cutting-edge plane that is parallel to said bottom face and that contains said cutting edge; and said bottom-cutting face of said cutting blade does not contact said surface of said anvil when sliding said bottom face of said cutting blade along said surface of said anvil toward said passageway.

19. The method of claim 18 wherein said acute angle is between about 15 degrees and 4 degrees.

20. The method of claim 18 wherein:

a top-cutting face of said cutting blade extends from a top face of said cutting blade to said cutting edge at a second acute angle relative to said cutting-edge plane; and a sum of said acute angle and said second acute angle is between about 60 degrees and about 65 degrees.

* * * * *